(12) United States Patent
Kraft

(10) Patent No.: US 7,623,945 B2
(45) Date of Patent: Nov. 24, 2009

(54) ROBOTIC MASTER CONTROLLER

(75) Inventor: Brett W. Kraft, Prairie Village, KS (US)

(73) Assignee: Kraft Telerobotics, Inc., Overland Park, KS (US)

( * ) Notice: Subject to any disclaimer, the term of this patent is extended or adjusted under 35 U.S.C. 154(b) by 543 days.

(21) Appl. No.: 11/444,067

(22) Filed: May 31, 2006

(65) Prior Publication Data

US 2007/0282483 A1    Dec. 6, 2007

(51) Int. Cl.
*G05F 19/00* (2006.01)
*B25J 1/00* (2006.01)
*B25J 3/00* (2006.01)
*B25J 15/00* (2006.01)
*B25J 19/00* (2006.01)

(52) U.S. Cl. .............. 700/245; 414/2; 901/6; 901/14; 901/29

(58) Field of Classification Search .......... 700/245, 700/302, 250, 915, 900, 916, 917, 918, 257, 700/264, 261, 275, 279, 303, 306; 414/5, 414/7, 222; 16/110, 408, 430, 429; 901/32, 901/14, 29; 318/560, 568.11
See application file for complete search history.

(56) References Cited

U.S. PATENT DOCUMENTS

| | | | |
|---|---|---|---|
| 2,858,947 A * | 11/1958 | Chapman, Jr. ............ 414/5 |
| 4,566,690 A * | 1/1986 | Schook .................. 482/108 |
| 4,648,782 A | 3/1987 | Kraft |
| 4,883,400 A * | 11/1989 | Kuban et al. ............ 414/2 |
| 5,019,761 A | 5/1991 | Kraft |
| D461,484 S | 8/2002 | Kraft |
| 6,801,008 B1 * | 10/2004 | Jacobus et al. ........ 318/568.11 |
| 6,853,965 B2 * | 2/2005 | Massie et al. ............ 703/6 |
| 2005/0100627 A1 * | 5/2005 | McKinney ............ 425/267 |

* cited by examiner

*Primary Examiner*—Khoi Tran
*Assistant Examiner*—Kyung J Kim
(74) *Attorney, Agent, or Firm*—John C. McMahon

(57) ABSTRACT

A robotic master controller having a series of linking members interconnected by pivots to each other and a hand grip with relative position sensors therein and sensing yaw and pitch of the hand grip due to movement of the user. The final linking member including an arched section that terminates in a pivot for the hand grip that is located within the user's hand during use and has an axis of rotation that generally aligns with a roll axis of rotation of the arm when the user's hand rotates between a palm up configuration to a palm down configuration. The final linking member also includes an arched section that extends over and cradles the outer palm of the hand when the hand is in the palm up configuration. The user reaches around the outside (to the right for a right arm controller) to grasp the hand grip.

10 Claims, 5 Drawing Sheets

ROBOTIC MASTER CONTROLLER

BACKGROUND OF THE INVENTION

The present invention relates to master controllers for operating robotic devices and, in particular, to such a controller for a robotic device having an arm like structure and wherein the controller senses movement in the user's own arm and causes such movement to be mimicked in the robotic device.

Many robotic devices utilize robotic arms or arm like structures (herein generally referred to as arms) for conducting work at a site of use. Often such robotic arms are utilized in environments which are dangerous or hazardous to humans, such as deep sea construction or exploration, chemical or explosives handling, outer space construction and the like. Consequently, it is advantageous to have a master controller that links to the robotic device and that allows a user, especially a user in a remote area from the robotic device to control the robotic device. That is, the robotic device is slaved to the master controller, follows the movement of the user's arm, including the hand, and transfers this movement to the robotic device, so that the robotic arm can be controlled by the user to make movements in a manner similar or equivalent to the motions the user would make, if the user were performing the task.

The art of such controllers has been well developed in sensors that sense motion in the user's body and transmit the motion to the robotic device and such sensing and transmitting is not part of the invention of the present application. It is also possible to provide such controllers with force feedback so that the user senses the reactionary force being applied to the robotic arm. Such devices are disclosed in applicant's prior U.S. Pat. No. 5,019,761 which is incorporated herein by reference.

Prior master controllers have been developed that provide for mimicking some movement of the upper and lower arm, such as applicant's previous U.S. Pat. No. 5,019,761 and D461,484; however, the present device is an improvement over the devices shown in those patents. In some prior art devices, the controller is too bulky, heavy or cumbersome. But, the most significant problem has to do with positioning the controller to sense roll (rotation about the long axis of the forearm) and then allowing the user a wide range of movement, while providing a sturdy and easy to use structure.

Roll has always presented difficulty to the designers of such controllers. This is because it is desirable in such controllers for a handle, hand control or hand grip to be allowed to rotate almost one hundred and eighty degrees without the hand grip or the user hitting another part of the controller and the prior art has had difficulty in providing such. In the U.S. Pat. No. 5,019,761 this was accomplished by providing a circular track or hoop that followed a structure at the end of a remainder of the controller. Such a track is fragile and can easily become dirty or damaged by nicks or the like in the metal, thereby significantly reducing smoothness of operation over time and producing an undesirable resistance. Other devices have tried to resolve this by placing the point of rotation of the hand grip outside the axis of rotation of the forearm, but this does not properly mimic the arm. Still other attempts have been made to place the roll pivot and sensor to the front of the hand, but this makes the device bulky and cumbersome to use, especially in tight quarters.

In the past, such controllers were designed so that the arm was placed on the inside of the controller or to the left of a controller for a right handed person. Because the forearm also rotates the hand to the right, when the hand turns from palm up to palm down, such movement of the hand would interfere with any structure that extended directly from the rest of the controller to the hand grip.

Consequently, applicant conceived of moving the arm to the outside or right side of a right handed controller and developed structure that cooperates with such placement and that allows the hand grip to roll with the hand while maintaining the axis of rotation of the hand grip aligned with the axis of rotation of the forearm.

SUMMARY OF THE INVENTION

A robotic arm master controller having elements which when moved by an arm of a user mimics the user's arm movements and conveys those movements to a robot slaved to the controller. The controller includes five rigid links, arm sections or members linked together at pivots with position sensors adapted to sense relative movements between each.

Pivotally joined to the last of the members is a hand control or hand grip including various finger operated controls. The hand grip is sized and shaped to fit in the palm of the user and may extend outwardly at opposite ends thereof form the hand. The user holds the hand grip by reaching around the remainder of the controller to the outside or right side thereof for a right handed controller with the operator reaching around the left side of a left handed controller.

The last of the members includes an arched section that is sized and positioned so as to be pivotally joined to the hand grip at a location within the hand of a user when the hand grip is being grasped by a user. The arched section is further sized and positioned to enter the hand above the palm to the opposite side from the thumb when the hand is palm up and such that the outer edge of the hand opposite the thumb is cradled by the arched section. The axis of rotation of the pivot joining the arched section to the hand grip is generally aligned with an axis of rotation of the forearm during roll. The arched section extends over an arc of approximately ninety degrees. The hand can rotate generally between palm up and palm down without engaging obstructing structure of the controller during such rotation.

In this manner, the controller serves and provides for yaw and pitch associated with the upper arm and lower arm (at the wrist) and roll associated with turning the forearm about the longitudinal axis thereof. Preferably, the controller has axes of rotation associated with yaw, pitch and roll of the wrist that all intersect approximately in the center of the wrist.

OBJECTS AND ADVANTAGES OF THE INVENTION

Therefore, the objects of the invention are: to provide a robotic master controller that allows for substantial roll movement and wherein the position sensors for such roll movement have a pivot associated therewith that is generally coaxial with rotation of the forearm; to provide such a controller wherein roll movement between a final link of the controller and a distal hand grip is conveyed through a pivot rather than a track; to provide such a controller wherein the roll pivot is located within the hand during usage and aligned with an axis of rotation of the forearm; to provide such a controller wherein the arm of the user wraps about the outside of the controller rather than being located to the inside or left side of a right handed controller; to provide such a controller that is not bulky or heavy and requires comparatively low maintenance; to provide such a controller wherein the roll connection between the hand grip and the rest of the controller remains generally clean and free of nicks throughout the life of the controller thereby providing a smooth and resistance free movement therebetween; and to provide a controller that is easy to use and is especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
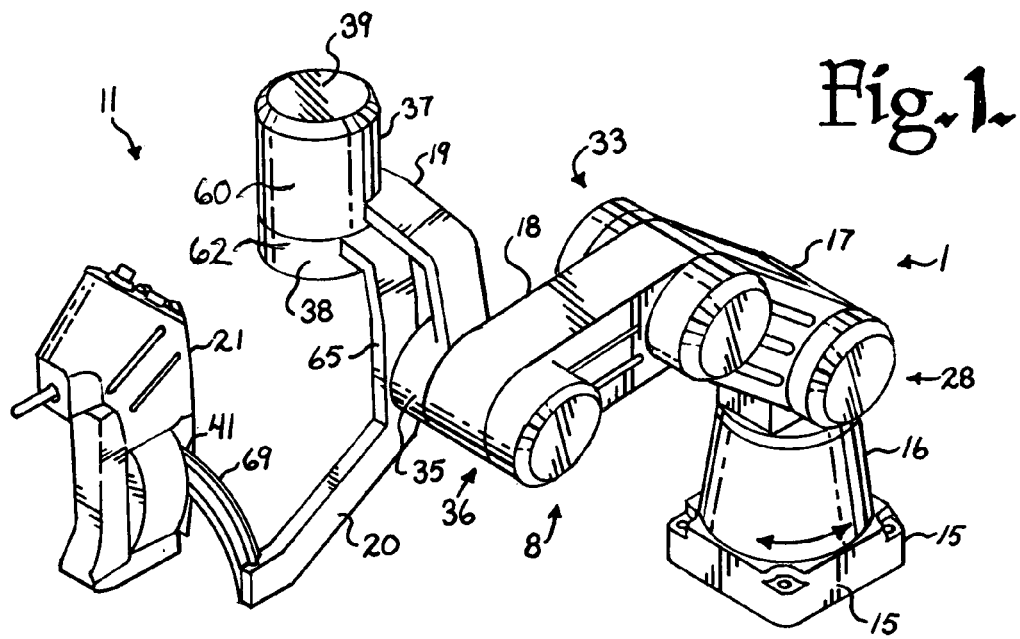
FIG. 1 is a perspective view of a master controller in accordance with the present invention.
Figure 2:
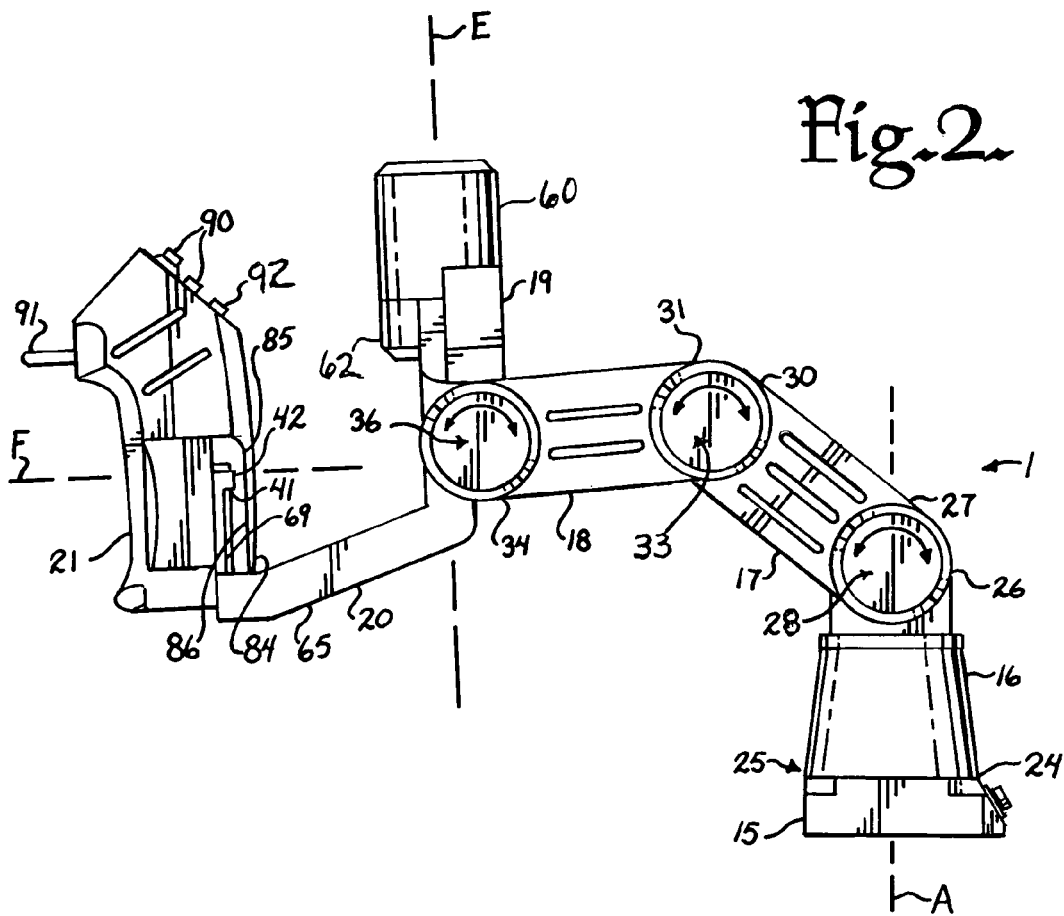
FIG. 2 is a first side elevational view of the controller.
Figure 3:
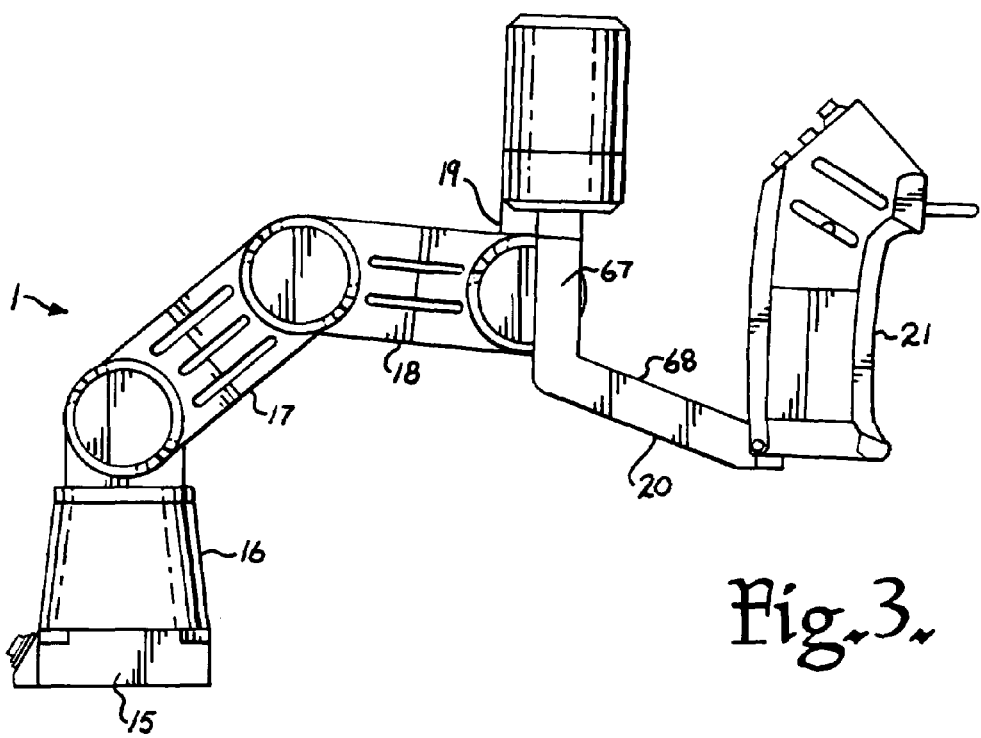
FIG. 3 is a second side elevational view of the controller.
Figure 4:
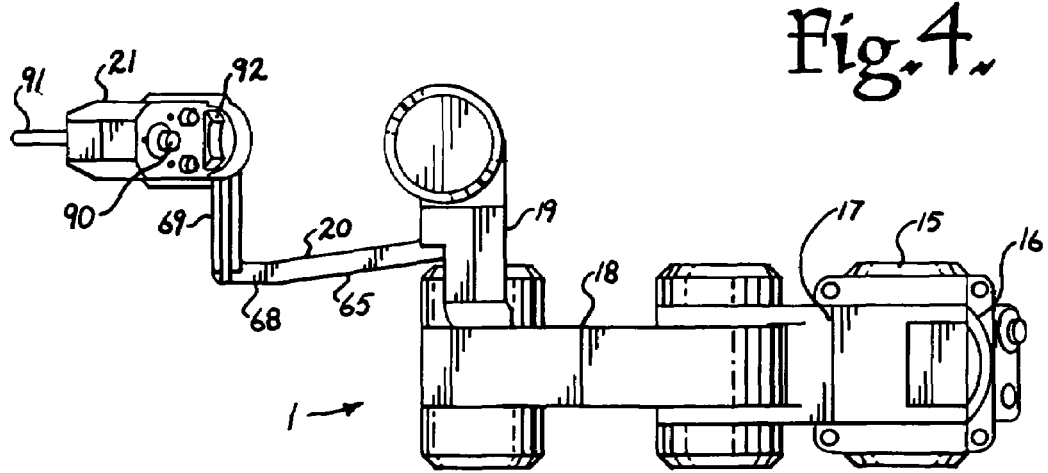
FIG. 4 is a top plan view of the controller.
Figure 5:
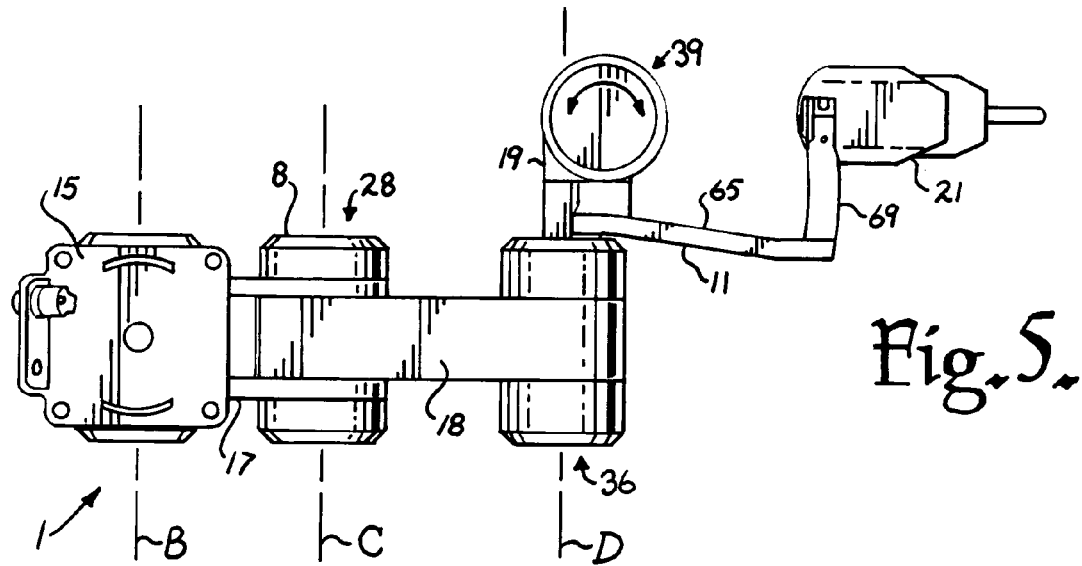
FIG. 5 is a bottom plan view of the controller.
Figure 6:
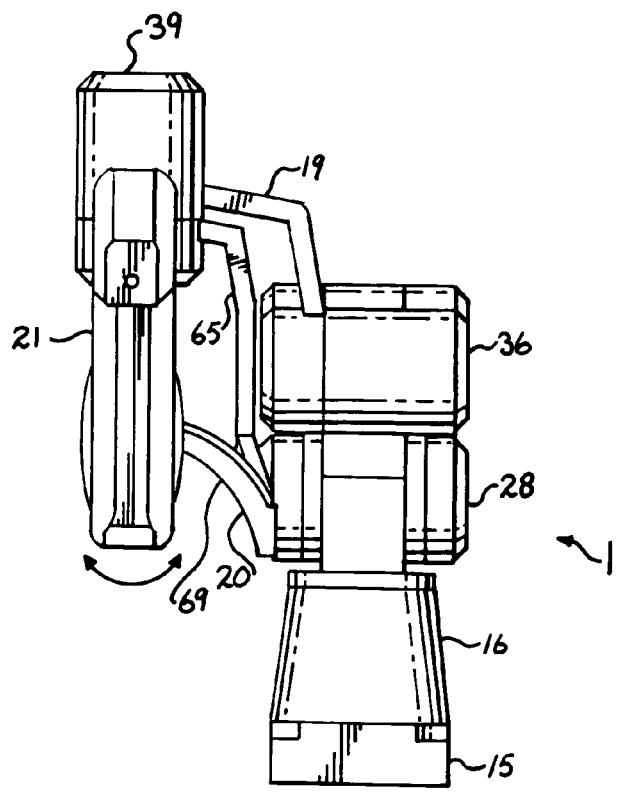
FIG. 6 is a front elevational view of the controller.
Figure 7:
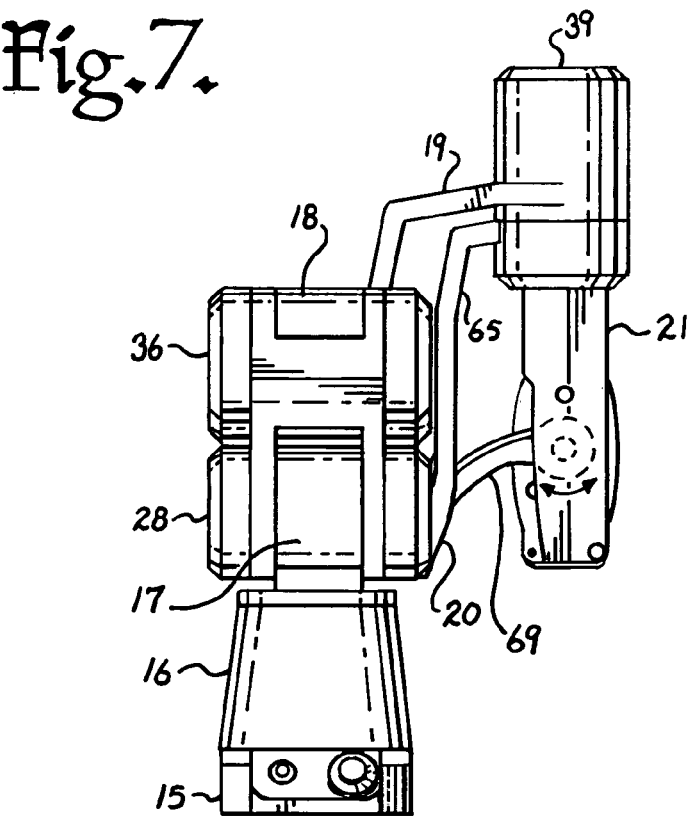
FIG. 7 is a rear elevational view of the controller.
Figure 10:
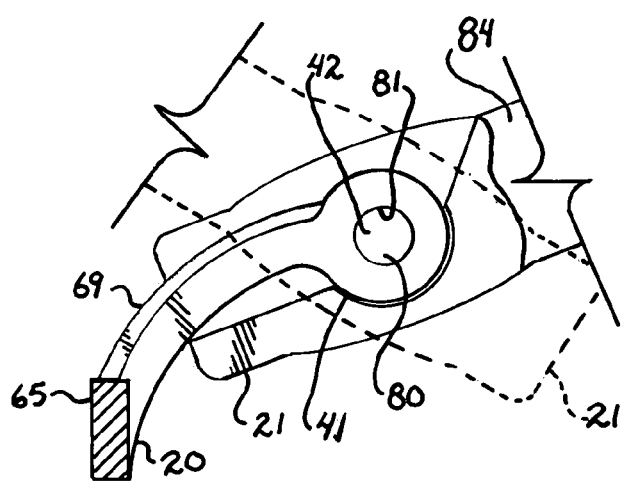
FIG. 10 is a fragmentary view of a portion of the controller showing rotation of the hand grip thereof between a first position in solid lines and a second position in phantom lines.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a robotic master controller in accordance with the present invention, mounted on a support 4 and operated by a user 5.

The controller 1 may be used with many different types of robotic devices wherein it is needed or desirable to mimic the movements of the user's arm or hand in the robotic device. Such a device can include robotic arms used on outer space craft, submergibles for exploration or construction, digging equipment such as backhoes and the like, robots that inspect or disarm hazardous or explosive materials or devices, and similar devices.

While the present controller may be used without force feedback, it is preferred that a force feedback system be incorporated herein along with the sensors and motors needed to provide such operation. A force feedback system is illustrated and described in the present inventor's U.S. Pat. No. 5,019,761 which is incorporated herein by reference. As the present invention is not directed to modification of the force feedback system or of the position sensors or motors, those structures are not reiterated herein in detail and one having ordinary skill in the art is directed to the U.S. Pat. No. 5,019,761 for an explanation of those structures and how to incorporate them within the present invention.

The support 4 can be any structure of sufficient size and strength to support the controller 1 during use. For this purpose, the support may be a desk or table top, a free standing base or even the arm rest of a user's chair. As the controller 1 may be utilized in tight quarters, such as aboard a deep sea exploratory submarine, it is preferred that both the size and weight be kept at a minimum. It is also necessary that the length of the controller 1 when fully extended forward not exceed the extended arm length of the user 5.

The controller 1 allows a user 5 to control yaw (side to side pivotal movement or pivot about a lateral plane through a longitudinal portion of a device) and pitch (up and down pivot of a longitudinal portion of a device relative to a vertical axis) of the upper portion 8 of the controller 1 corresponding to an upper arm 9 of the user 5, as well as yaw, pitch and roll (rotation about a longitudinal axis of a longitudinal portion of a device) of the lower portion 11 of the controller 1 corresponding to a lower arm or wrist 12 of a user 5.

In particular, the controller 1 has a base 15, a first member 16, a second member 17, a third member 18, a fourth member 19, a fifth member 20 and a hand grip 21. The base 15 is attached to the support 4 and does not move relative to the support 4 during use. The first member 16 has a first end 24 that rotates about an axis A relative to the base 15 at a joint 25. The first member 16 has a second end 26 that rotates about an axis B relative to a first end 27 of the second member 17 at a joint 28.

The second member 17 has a second end 30 that rotates about an axis C relative to a first end 31 of the third member 18 at a joint 33. The third member 18 has a second end 34 that rotates relative to an axis D relative to a first end 35 of the fourth member 19 at a joint 36. The fourth member 19 has a second end 37 that rotates about an axis E relative to a first end 38 of the fifth member 20 at a joint 39. The fifth member 20 has a second end 41 that is pivotally connected to the hand grip 21 and rotates about an axis F at pivot joint 42.

Located at each of the joints 25, 28, 33, 36, 39 and 42 and part thereof are interior sensors that sense the relative positions of the elements connected at the joints 25, 28, 33, 36, 39 and 42 and motors that provide force feedback to the user 5 relative thereto.

The axes B, C and D are parallel to each other and perpendicular to the axes A and E. The axes D and E are positioned or located so as to intersect with a wrist 50 of a user 5 during use. Rotation about the axis E controls yaw at the wrist 50, whereas rotation about the axis D determines or controls pitch at the wrist 50. Rotation about the axes B, C and D controls pitch relative to the user's upper arm 9, as well as extension or distance of the hand grip 21 relative to the base 15. Rotation about the axis A controls yaw relative to the user's upper arm 9. Rotation about the axis F controls roll of the hand grip 21 relative to the base 15.

The first member 16 extends upwardly from the base 15. The second member 17 and third member 18 each have an elongate and generally rigid outer structure enclosing the sensors and motors described above. The fourth member 19 includes a rigid portion 55 joined at the first end 35 to a cylindrical portion 56 that rotates coaxially with the axis D. The rigid portion 55 has a medial bend 58 therein and the second end 37 is joined to a cylindrical portion 60 that is coaxial with the axis E.

The fifth member 20 has a cylindrical portion 62 at the first end 38 thereof that pivotally connects with the fourth member cylindrical portion 60 and is coaxial with the axis E. Attached to the fifth member cylindrical portion 62 is a rigid and elongate portion 65 having a first downwardly extending section 67, thereafter a forwardly extending section 68 and thereafter an arched section 69. The arched section 69 terminates at the second end 41 of the fifth member 20 near a location that is along axis F.

Figure 8:
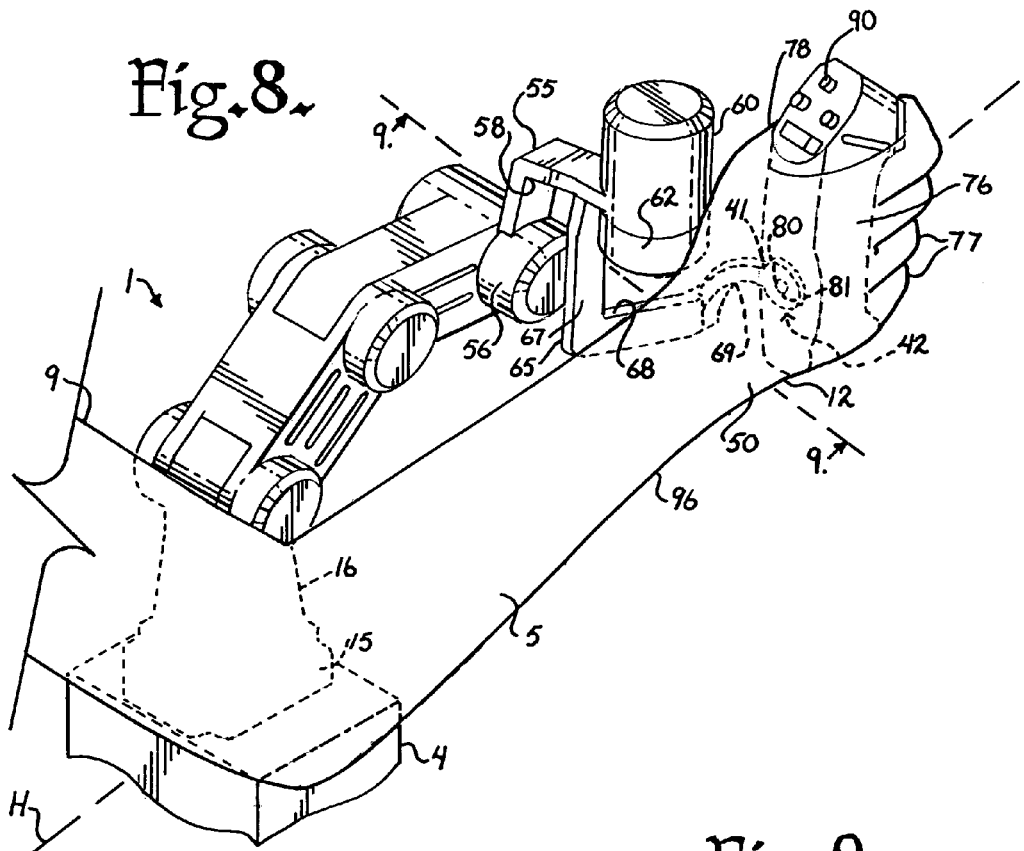
FIG. 8 is a perspective view of the controller mounted on a support and illustrating a user operating the controller.

The fifth member 20 in conjunction with the remainder of the controller 1 is sized and shaped to allow a user 5 to extend or reach the user's arm laterally around the controller 1 and grasp the hand grip 21, as is seen in FIG. 8. That is, when the controller 1 is designed for a right handed usage, the user 5 reaches laterally outwardly and forward or to the right around the controller to grasp the hand grip 21 and in the opposite manner for a controller 1 for a left handed usage.

Figure 9:
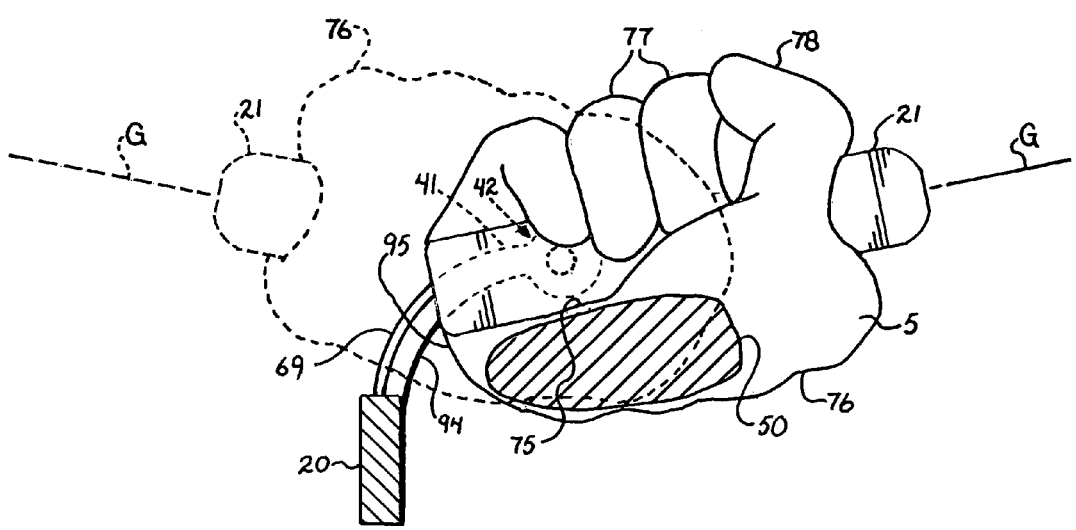
FIG. 9 is a cross sectional view of the controller, taken along line 9-9 of FIG. 8 showing rotation of a hand grip between a first position in solid lines and a second position in phantom lines.

The hand grip 21 has a typical grip overall shape. The hand grip 21 is sized and shaped to comfortably fit in a palm 75 of a hand 76 of the user 5, as is seen in FIGS. 8 and 9, with fingers 77 and thumb 78 wrapping about the hand grip 21 on both sides. The hand grip 21 is pivotally joined at the joint 42 to the fifth arm 20 by a pivot pin 80 that extends between the hand grip 21 and the arched section 69 so as to be medially located from top to bottom and generally centrally located from side to side. The pin 80 is located in a bore 81 in the arch section 69. A cover 84 extends along the rear of the hand grip 21 so as to protect the user's hand 76 from engagement with the pivot 42; however, the left lateral side 85 of the cover 84 is open to provide a slot 86 to allow the hand grip 21 to rotate relative to the arch section 69. In this manner, the hand grip 21 can rotate about axis F over a range of approximately 160°, as is shown in FIG. 9, although this range may be varied somewhat in certain applications.

The hand grip 21 can be variously equipped with push buttons 90, depress controls 91, rocker switches 92 and the like that correspond to certain elements that are to be controlled in the robotic arm slaved to the controller 1, such as claws or the like. In certain situations the function of the various grip elements on the hand grip 21 can be modified electronically or physically to allow the user 5 to select control of different aspects of the robotic device, different robotic devices or devices that provide information about the robotic device.

The arched section 69 is important to the function of the controller 1 in accordance with the invention. In particular, it allows the hand grip 21 to be comfortably held in the hand 76 of the user without interfering with roll of the hand grip 21 over a comparatively wide range of motion. This is seen especially in FIG. 9 wherein the hand 76 and hand grip 21 that are shown in solid lines are rotated (or rolled) to the right and are shown in phantom lines rotated to the left. The elongate centerline of the hand grip is indicated in each case by the axis G.

The arched section 69 has a hand facing surface 94 that is curved and sized and shaped to allow the hand's palm 75 to swing upward and to the right as the hand grip 21 is rotated to the right and, thereafter, cradle an outer portion 95 of the palm 75 when at the full extent of rotation to the right. The surface 94 extends over an arc of approximately ninety degrees.

The pivot 42 is positioned so as to be located generally in the middle of the grasping hand 76 just above the palm 75 and generally along an axis H which passes through the elongate center of a forearm 96 associated with the hand 76 and remaining generally in that location as the hand 76 rolls or rotates between the maximum ranges thereof, as seen in FIG. 9. In this manner, the yaw, pitch and roll associated with the user's lower arm 12 are imparted to the controller 1, as the user 5 moves, thus conveying substantially equivalent movement to a robotic device slaved to the controller 1.

In use, the user 5 grasps the hand grip 21 in the user's hand 76 and moves his arm upper portion 8 and hand 76 at the wrist 50 to control similar structure on a robotic device. The position, location and shape of the fifth member 20 and especially the arched section 69 allows the controller 1 to follow roll of the user's hand 76 over a wide range of rotation without the hand 76 engaging obstructing structure of the controller 1 and with the structure associated with roll. The pivot 42 and hand grip 21 where joined to pivot 42, are especially located within the hand 76 and generally in line with the forearm rotational axis H. Because the arched section 69 enters the hand holding the hand grip 21 opposite the thumb 78 and the pivot 42 is located in the palm 75, the hand 76 can turn completely over, as seen in FIG. 9, without interference from other parts of the controller 1, while still allowing the pivot axis F to be generally maintained in alignment with the arm axis H.

It is to be understood that while certain forms of the present invention have been illustrated and described herein, it is not to be limited to the specific forms or arrangement of parts described and shown.

What is claimed and desired to be secured by Letters Patent is as follows:

1. A robotic arm master controller comprising:
    a) a base adapted to be secured to a supporting structure;
    b) a first member rotatably connected to said base and providing upper arm yaw movement;
    c) a second member and a third member that are serially and rotatably connected to each other and to said first member and providing extension movement and upper arm pitch movement;
    d) a fourth member rotatably connected to said third member by a first pivot having a first axis of rotation and that is positioned so as to be adapted to be operably aligned with the wrist of a user and providing for wrist yaw movement;
    e) a fifth member rotatably connected to said fourth member by a second pivot having a second axis of rotation and positioned so as to be adapted to be aligned with the wrist of the user and wherein said second axis of rotation is at an angle of ninety degrees from said first axis of rotation and further providing for wrist pitch movement;
    f) said fifth member including an arched section; and
    g) a hand grip that is sized and shaped so as to be adapted to be held in a palm of a hand of the user; said hand grip being pivotally joined to said fifth member at a third pivot near a distal end of said arched section and providing for roll associated with the hand; said arched section being sized and shaped so as to be adapted to extend across the palm of the hand of a user during use, so that the third pivot is located within the hand during use.

2. The master controller according to claim 1 wherein:
    a) said third pivot allows for rotation of said hand grip over a range of from the hand of a user being in a palm down position to the hand of a user being in a palm up position; and
    b) said arched section being sized and shaped to cradle the outer palm of a user opposite a user's thumb when the hand grip is in a palm up position.

3. The master controller according to claim 1 wherein:
    a) said hand grip and members are aligned and positioned such that the user reaches about the outside of the controller in order to grasp the hand grip.

4. The master controller according to claim 1 wherein:
    a) said arched section has a curved region having an arc of about ninety degrees and being located so as to face the hand of a user during usage.

5. The master controller according to claim 4 wherein:
    a) said curved region extends along a plane that is perpendicular to said axis of rotation of said third pivot.

6. The master controller according to claim 1 wherein:
   a) said fifth member includes a first downwardly projecting section pivotally joined to said fourth member at said second pivot and a second forwardly projecting section projecting from a lower end of said first projecting section and forwardly joined to said arched section.

7. In a robotic master controller having a hand grip adapted to be held in the hand of a user and a series of interconnected linking members allowing a user to adjust the yaw, pitch and roll of the hand grip; the improvement wherein:
   a) said hand grip is joined to a final linking member by a pivot that allows for roll of the hand grip and the pivot is located so as to be in encircled by the hand of a user during use and has an axis of rotation that is generally aligned with an axis of rotation of a user's arm during use.

8. The master controller according to claim 7 wherein:
   a) said final linking member includes an arched section that is configured to be adapted to extend across the palm of a user during use with the arched section having a curved surface sized and shaped to receive and cradle the user's hand opposite the thumb when the user's hand is in a palm up position.

9. The master controller according to claim 8 wherein:
   a) said curved surface extends through an arc of approximately ninety degrees.

10. The master controller according to claim 9 wherein:
    a) said curved surface follows a plane that is perpendicular to an axis of rotation of said pivot.

* * * * *

UNITED STATES PATENT AND TRADEMARK OFFICE
CERTIFICATE OF CORRECTION

PATENT NO. : 7,623,945 B2  
APPLICATION NO. : 11/444067  
DATED : November 24, 2009  
INVENTOR(S) : Brett W. Kraft Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 720 days.

Signed and Sealed this

Twenty-sixth Day of October, 2010

David J. Kappos  
*Director of the United States Patent and Trademark Office*